(12) United States Patent
Anderson et al.

(10) Patent No.: US 7,387,478 B2
(45) Date of Patent: Jun. 17, 2008

(54) MACHINING SYSTEM WITH INTEGRATED CHIP HOPPER

(75) Inventors: James Anderson, Dearborn, MI (US); Alexander Stoll, Plymouth, MI (US); Thomas Loch, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 7 days.

(21) Appl. No.: 10/711,150

(22) Filed: Aug. 27, 2004

(65) Prior Publication Data

US 2006/0045641 A1     Mar. 2, 2006

(51) Int. Cl.
    *B23Q 11/08* (2006.01)
(52) U.S. Cl. .......................... 409/134; 408/67; 83/109; 451/453; 29/DIG. 79; 29/DIG. 94
(58) Field of Classification Search ................ 409/134, 409/137; 408/67; 144/252.1; 29/DIG. 79, 29/DIG. 94; 74/608; 451/451, 453; 83/109, 83/147
See application file for complete search history.

(56) References Cited

U.S. PATENT DOCUMENTS

| 3,313,331 | A | * | 4/1967 | Di Pierro et al. ........ 241/101.1 |
| 3,534,658 | A | | 10/1970 | Carsey |
| 3,905,273 | A | | 9/1975 | Shook |
| 4,174,591 | A | * | 11/1979 | Dupre et al. ................ 451/103 |
| 4,514,936 | A | | 5/1985 | Hurtado |
| 4,555,874 | A | | 12/1985 | Chung |
| 4,889,290 | A | * | 12/1989 | Koffsky et al. ............... 241/36 |
| 4,955,770 | A | | 9/1990 | Kitamura |
| 5,115,599 | A | * | 5/1992 | Stolzer et al. .............. 451/334 |
| 5,456,022 | A | * | 10/1995 | McLeod et al. ............... 34/77 |
| 5,607,269 | A | | 3/1997 | Dowd et al. |
| 5,611,137 | A | | 3/1997 | Braun |
| 5,645,382 | A | | 7/1997 | Homanick et al. |
| 5,775,542 | A | * | 7/1998 | Field ....................... 222/146.5 |
| 5,951,219 | A | | 9/1999 | Stadtfeld et al. |
| 5,979,039 | A | | 11/1999 | Rehm |
| 6,021,969 | A | * | 2/2000 | Schmitt et al. ............. 241/171 |
| 6,112,504 | A | * | 9/2000 | McGregor et al. ............ 53/417 |
| 6,116,616 | A | * | 9/2000 | Bratten ....................... 277/646 |
| 6,296,599 | B1 | | 10/2001 | Staiger |
| 6,299,393 | B1 | | 10/2001 | Anders |
| 6,547,497 | B2 | | 4/2003 | Lof et al. |
| 6,568,885 | B2 | | 5/2003 | Green |
| 6,569,217 | B1 | * | 5/2003 | DeMarco ...................... 55/324 |
| 6,571,838 | B1 | * | 6/2003 | Chiang .................... 144/252.1 |
| 6,662,685 | B2 | * | 12/2003 | Kuriki et al. ................. 74/612 |
| 7,241,090 | B2 | * | 7/2007 | Reynders .................... 409/135 |

(Continued)

FOREIGN PATENT DOCUMENTS

DE         7607785        7/1976

(Continued)

*Primary Examiner*—Monica S. Carter
*Assistant Examiner*—Eric A Gates
(74) *Attorney, Agent, or Firm*—Raymond Coppiellie; Brooks Kushman P.C.

(57) ABSTRACT

A machining system having a machining envelope, a housing, a hopper, and a seal. The housing defines at least a portion of the machining envelope. The hopper has a top surface defining an opening. The seal is disposed between the housing and the top surface. The hopper is configured to receive particulates when positioned below the machining envelope.

12 Claims, 4 Drawing Sheets

U.S. PATENT DOCUMENTS

2003/0131571 A1* 7/2003 Demarco .................... 55/324

FOREIGN PATENT DOCUMENTS

| DE | 269 822 A1 | 7/1989 |
| DE | 296 03 771 U1 | 8/1997 |
| GB | 524241 | 8/1940 |
| GB | 2 286 665 A | 8/1995 |
| JP | 2000117583 | 4/2000 |
| JP | 2002355516 | 12/2002 |

* cited by examiner

MACHINING SYSTEM WITH INTEGRATED CHIP HOPPER

BACKGROUND OF THE INVENTION

1. Field of the Invention

The present invention relates to a machining system having a hopper adapted to receive particulates, such as chips.

2. Background Art

Previously, machine tools used coolant to flush chips from workpiece and machine tool surfaces. Chips were removed from the coolant using a filtration system that deposited chips on an indexable media and dumped the deposited chips into a chip hopper. In such systems the filtration system and chip hopper were located apart from the machine tool. Consequently, these systems required expensive coolant filtration systems as well as coolant handling equipment to transport chips from the machine tool to the filtration system. In addition, such systems did not help contain airborne particulates, such as oil mist. As a result, air filtration equipment was needed to improve air quality.

Before Applicants' invention, a system for containing particulates, such as oil mist and chips, without the need for coolant, coolant filtration equipment, and air filtration equipment was needed. Problems associated with the prior art as noted above and other problems are addressed by Applicants' invention as summarized below.

SUMMARY OF INVENTION

According to one aspect of the present invention, a machining system having a machining envelope is provided. A machining system includes a housing, a hopper, and a seal. The housing defines at least a portion of the machining envelope. The hopper has a top surface defining an opening. The seal is disposed between the housing and the top surface. The hopper is configured to receive chips when positioned below the machining envelope.

The machining system may include a lift platform adapted to raise the hopper to position the seal adjacent to the housing and the hopper.

The funnel adapted to direct particulates into the hopper may be disposed on the housing above the chip hopper and below the machining envelope. The funnel may include a blower adapted to blow chips into the hopper.

The hopper may include a bottom panel having a set of wheels and/or a channel adapted to receive a forklift fork.

The hopper and/or the housing may include a vent and a filter disposed proximate the vent. The filter may be adapted to allow pressurized air to exit the hopper while inhibiting particulates from exiting the hopper.

According to another aspect of the present invention, a machining system having a cutting tool adapted to engage a workpiece and a housing is provided. A housing includes an upper housing portion adapted to receive the cutting tool and workpiece. The upper housing portion defines a machining envelope. The lower housing portion defines a chip hopper adapted to receive chips generated by the cutting tool in the machining envelope. The housing is moved away from the cutting tool and workpiece to facilitate removal of chips from the chip hopper.

The upper housing portion may include a first panel having a first opening configured to allow the cutting tool to be positioned in the housing. The second panel may include a second opening configured to allow the workpiece to be positioned in the housing.

First and second flaps may be disposed proximate the first and second openings, respectively. The first and second flaps may be adapted to cover the first and second openings when the cutting tool and workpiece are positioned outside the housing.

The lower housing portion may include a bottom panel having at least one door configured to open to facilitate removal of chips.

According to another aspect of the present invention, a machining system having a housing and a chip hopper is provided. The housing includes an upper portion, a lower portion, and a mating portion. The upper portion defines a machining envelope. The lower portion is disposed proximate the upper portion and includes an access port. The mating portion defines a first aperture and is disposed proximate the upper and lower portion. The mating portion includes a bottom surface. The chip hopper is adapted to be inserted through the access port into the lower portion. The chip hopper includes a top surface defining a second aperture and a seal disposed on the top surface. The seal is adapted to engage the bottom surface of the mating portion to prevent particulates from exiting the housing.

The lower portion may include a second access port adapted to permit removal of the chip hopper. The lower portion may also include a lift mechanism adapted to raise the chip hopper to engage the seal with the bottom surface.

One advantage of the present invention is improved sealing and particulate containment to reduce mess and eliminate chip conveyance equipment and the associated costs. Another advantage is that negative air pressure can be provided inside the machining system to help contain particulates and eliminate the need for a separate air handling or filtration system. Another advantage of the present invention is that airflow can be more readily controlled to prevent particulates from collecting on housing surfaces where they may interfere with machining operations.

DETAILED DESCRIPTION OF THE PREFERRED EMBODIMENT(S)

Figure 1:
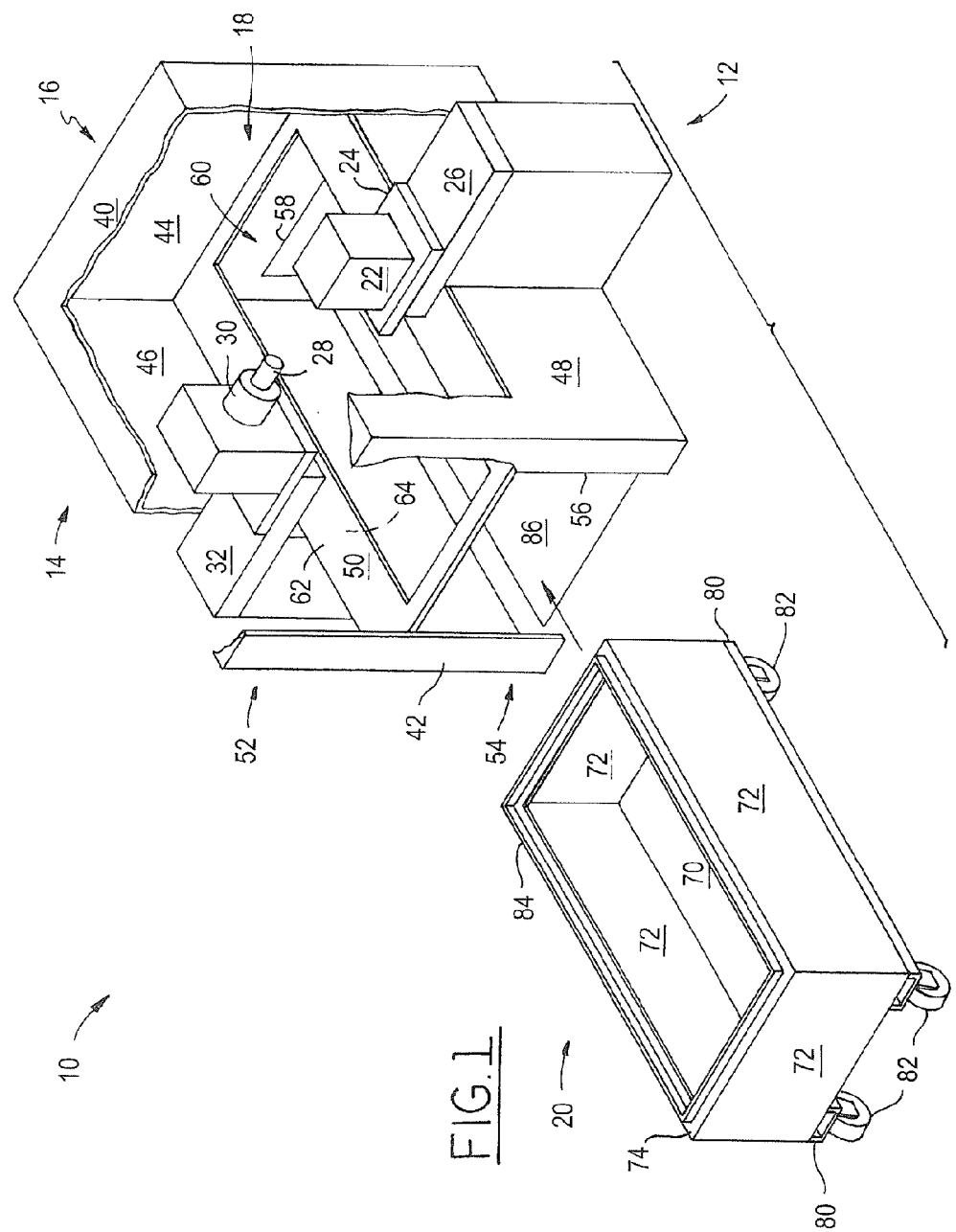
FIG. 1 shows a first embodiment of a machining system having a movable hopper.

Referring to FIG. 1, one embodiment of a machining system 10 in accordance with the present invention is shown. The machining system 10 includes a workpiece presenter 12, a tool presenter 14, a housing 16 defining at least part of a machining envelope 18, and a hopper 20.

The workpiece presenter 12 may include a workpiece 22 removably attached to a fixture 24. The fixture 24 may be mounted on a slide 26 that is configured to position the workpiece 22 and the fixture 24 relative to the housing 16. More specifically, the slide 26 may be configured to insert, remove, and position the workpiece 22 and fixture 24 in the machining envelope 18. The fixture 24 may have any suitable configuration for holding the workpiece 22.

The tool presenter 14 may include a cutting tool 28 connected to a spindle 30 that is adapted to rotate the cutting tool 28 about an axis of rotation. The spindle 30 may be mounted on a slide 32 adapted to position, advance, and retract the cutting tool 28 relative to machining envelope 18. The cutting tool 28 may be of any suitable type, such as a drill, tap, reamer, mill, counterbore, or groove cutter.

The slides 26,32 may have any suitable configuration and may include one or more slide platforms that may be positioned using a ball screw and servo motor assembly as is known by those skilled in the art.

The housing 16 is disposed around the machining envelope 18. The housing helps contain particulates, such as chips, dust, and oil mist, that are a byproduct of the machining process. The housing 16 may have any suitable configuration. For example, the housing 16 may include a set of interconnected panels. In the embodiment shown in FIG. 1, the housing includes a top panel 40, a front panel 42, a back panel 44, a left panel 46, a right panel 48, and a mating portion 50. The housing may be further defined as having an upper portion 52 that includes the machining envelope 18 and a lower portion 54 adapted to receive the hopper 20. The housing 16 may be made of any suitable material, such as sheet metal. In addition, the interior surfaces of the housing 16 may be oriented vertically to reduce accumulation of particulates.

One or more of the panels may include one or more openings that permit access to the machining envelope 18. In the embodiment shown in FIG. 1, the left and right panels 46,48 include openings that permit the workpiece 22 and cutting tool 28 to be advanced and retracted from the machining envelope 18. Alternatively, the openings may be disposed in the top, front, or back panels 40,42,44 depending on the configuration of the machining system 10.

The housing 16 may also include one or more access ports that allow the hopper 20 to be positioned in and removed from the housing 16. In the embodiment shown in FIG. 1, a first access port 56 is disposed in the front panel 42 and a second access port 58 is disposed in the rear panel 44. The access ports 56,58 may have any suitable configuration compatible with the hopper 20.

The mating portion 50 may be disposed proximate one or more interior surfaces of the housing 16. The mating portion 50 provides an interface between at least a portion of the housing 16 and the hopper 20. The mating portion 50 may be disposed between the upper and lower portions 52,54 and define an aperture 60 that permits particulates to pass from the upper portion 52 to the lower portion 54. The aperture 60 may be disposed proximate or below the machining envelope 18. In one embodiment, the mating portion 50 may extend inward from one or more housing panels and may include a top surface 62 facing the machining envelope 18 and a bottom surface 64 disposed opposite the top surface 62. Optionally, the mating portion 50 may be sloped to help direct particulates into the hopper 20. In another embodiment, the mating portion 50 may extend away from the machining envelope. For instance, the mating portion 50 may be disposed under one or more panels of the housing 16 proximate the aperture 60 such that the mating portion 50 does not extend toward the machining envelope. As such, the housing panels may be generally vertical, thereby reducing the number of surfaces on which particulates can accumulate.

The hopper 20 is adapted to receive and contain particulates from the machining envelope 18 and may be removed from the housing 16 to facilitate particulate disposal. The hopper 20 may have any suitable configuration. In the embodiment shown in FIG. 1, the hopper 20 includes a bottom panel 70, a plurality of interconnected side panels 72 disposed proximate the bottom panel 70, and an upper surface 74 disposed proximate the plurality of side panels. Optionally, at least a portion of the hopper 20 may be wider than the interior housing surfaces to help contain particulates.

The bottom and/or side panels 70,72 may have one or more features adapted to facilitate transportation of the hopper 20. For example, the hopper 20 may include one or more channels 80 adapted to receive a material handling apparatus, such as forks of a forklift. The channels 80 may have any suitable configuration. In the embodiment shown in FIG. 1, two channels 80 are disposed proximate the bottom panel 70. The channels may have any suitable configuration. For example, the channels may have a "U" shape having an opening that faces upward, downward, or to a side of the hopper 20.

Optionally, the hopper 20 may include one or more wheels 82 disposed proximate the bottom panel 70, side panels 72, and/or channels 80. The wheels 82 may swivel to facilitate positioning of the hopper 20.

A seal 84 may be disposed between the hopper 20 and the housing 16 to help contain particulates. More particularly, the seal 84 is disposed between the bottom surface 64 of the mating portion 50 and the top surface 74 of the hopper 20. In the embodiment shown in FIG. 1, the seal 84 is disposed on the top surface 74. Alternatively, the seal 84 may be disposed on the bottom surface 64. The seal 84 may have any suitable configuration, such as an inflatable tube, and may be made of any suitable material, such as a polymeric or elastomeric material like EPDM (ethylene propylene diene terpolymer), foam, or rubber. The seal 84 may be attached in any suitable manner, such as with fasteners or an adhesive.

Optionally, the machining system 10 may include a lift platform 86 adapted to raise and lower the hopper 20. The seal 84 may engage the bottom surface 64 and top surface 74 when the lift platform 86 is in a raised position. The seal 84 may disengage either the bottom surface 64 or the top surface 74 when the lift platform 86 is in a lowered position to facilitate removal of the hopper 20 from the housing 16.

Figure 2:
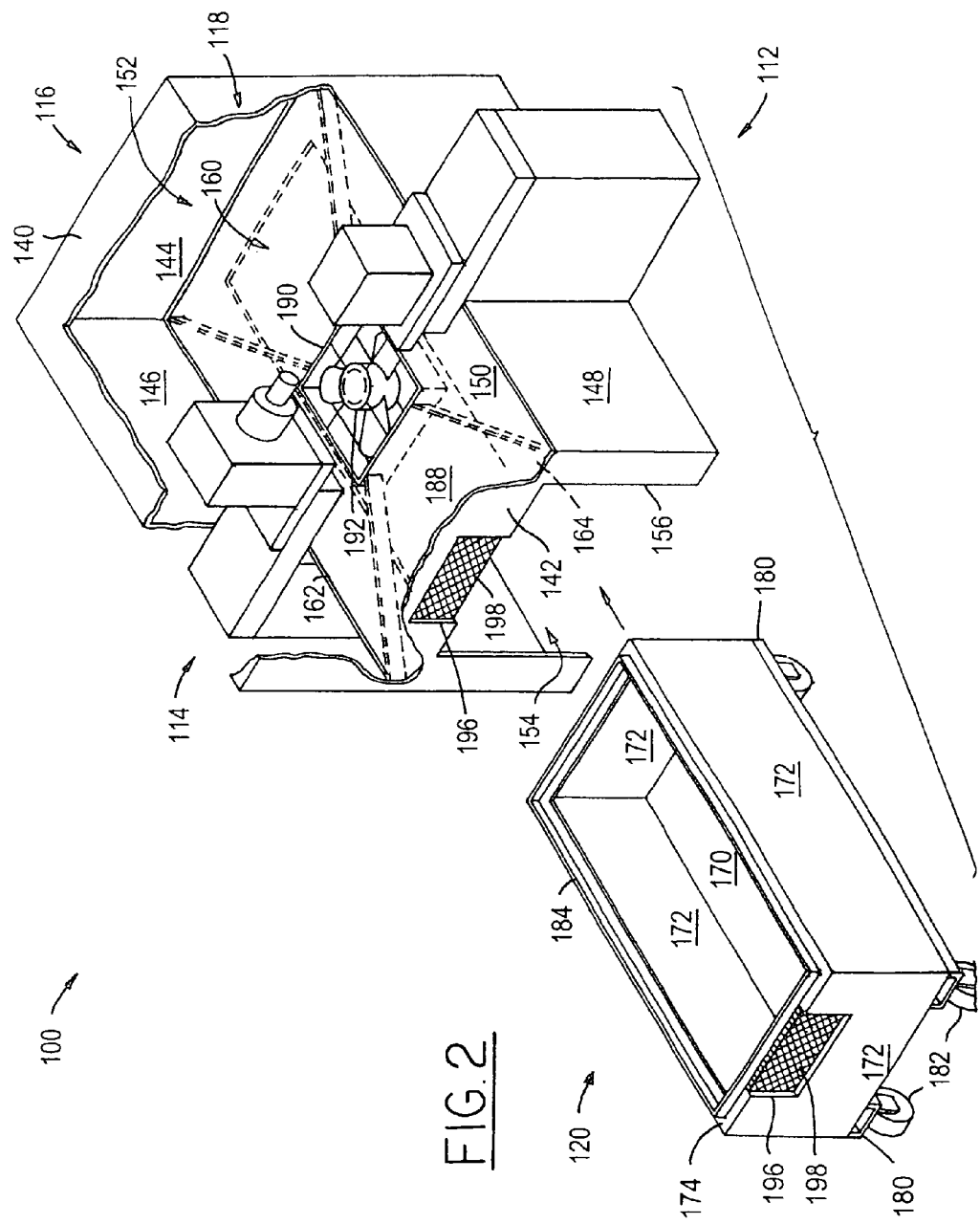
FIG. 2 shows a second embodiment of the machining system including the movable hopper and a funnel.

Referring to FIG. 2, a second embodiment of the machining system 100 is shown. Similar to FIG. 1, the machining system 100 includes a workpiece presenter 112, a tool presenter 114, a housing 116, a machining envelope 118, and a hopper 120.

The housing includes a top panel 140, a front panel 142, a back panel 144, a left panel 146, a right panel 148, a mating portion 150, an upper portion 152, and a lower portion 154. The front panel 142 includes a first access port 156. The mating portion 150 defines an aperture 160 and includes a top surface 162 and a bottom surface 164.

The hopper 120 may include a bottom panel 170, a plurality of side panels 172, a top surface 174, one or more channels 180, one or more wheels 182, and a seal 184 as previously described.

A funnel 188 is disposed proximate one or more interior surfaces of the housing 116. The funnel 188 extends downward from the machining envelope 118 and includes an aperture 190 through which particulates are directed. The funnel 188 may be disposed in any suitable location such as not to interfere with the positioning of the hopper 120. The funnel 188 may have any suitable configuration and may be made of any suitable material, such as sheet metal.

Optionally, a blower 192 may be disposed in the aperture 190 for directing particulates from the machining envelope 118 into the hopper 120. The blower 192 may be adapted to provide negative air pressure inside of the housing 116 to promote sealing and to inhibit leakage of particulates.

The housing 116 and/or hopper 120 may include one or more vent openings 196 that may include one or more filters 198. The vent openings 196 and/or filters 198 permit pressurized air from the blower 192 to escape the lower portion 154 of the housing 116 and/or hopper 120 while inhibiting particulates from exiting the hopper 120. In the embodiment shown in FIG. 2, two vent openings 196 are disposed proximate to each other. However, the openings may be spaced apart from each other in any suitable location under the funnel 188.

Figure 3:
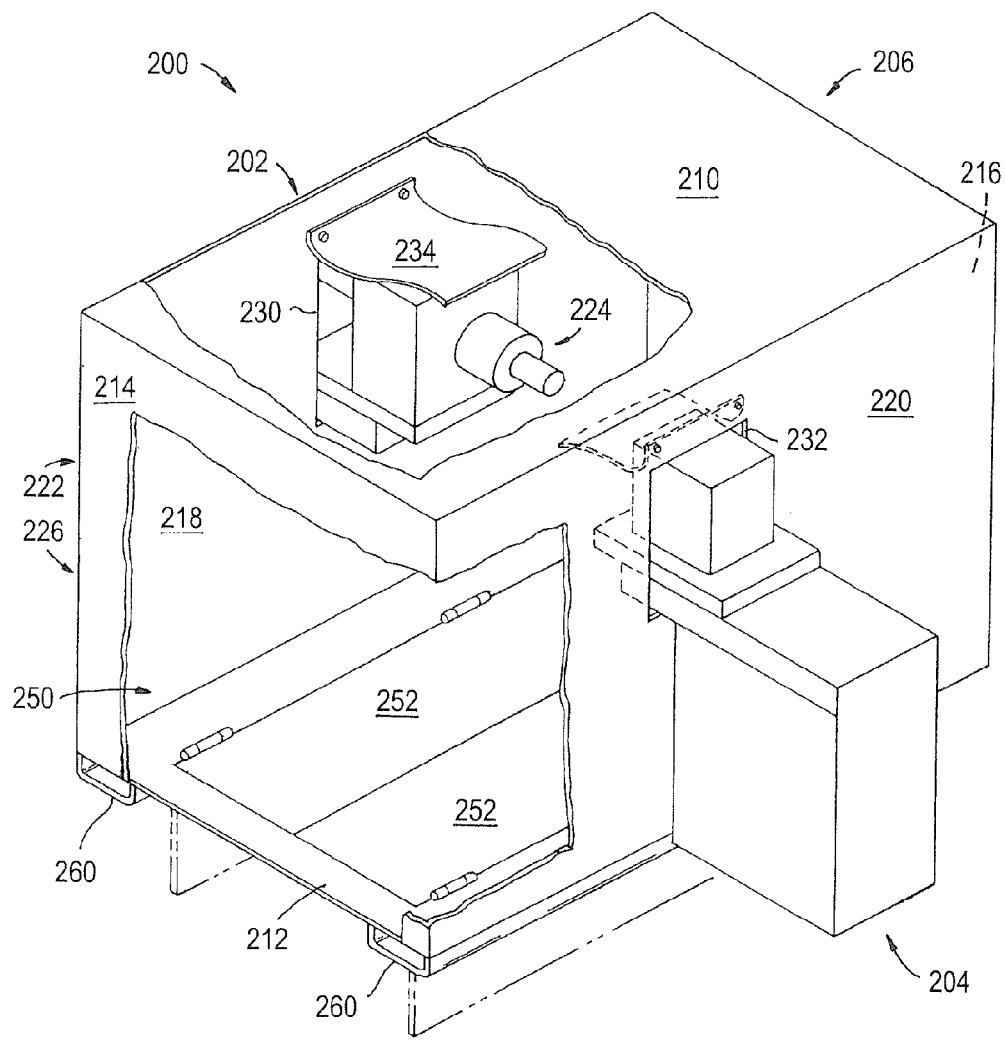
FIG. 3 shows a third embodiment of the machining system having a movable housing.

Referring to FIG. 3, a third embodiment of the machining system 200 is shown. In this embodiment, machining system includes a workpiece presenter 202 and a tool presenter 204 as previously described. In addition, the machining system includes a moveable housing 206.

The moveable housing 206 includes a top panel 210, a bottom panel 212, a front panel 214, a back panel 216, a left panel 218, and a right panel 220. In addition, the housing 206 includes an upper portion 222 at least partially defining a machining envelope 224 and a lower portion 226 disposed proximate the upper portion 222.

The upper portion 222 may include first and second openings 230,232 to facilitate insertion and removal of at least a portion of the workpiece presenter 202 and tool presenter 204 as previously described. In addition, one or more flaps 234 may be disposed on the housing 206 and at least partially cover the opening 230,232 when the workpiece and/or cutting tool are removed from the machining envelope 224.

The lower portion 226 includes a hopper portion 250 integrated with the housing 206 that is adapted to receive and contain particulates. In addition, the lower portion 226 includes one or more doors 252 configured to move between a closed position shown in solid lines and an open position shown in phantom. The doors 252 may be opened to facilitate the removal of particulates from the housing 206. The doors 252 may be attached to the bottom panel 212 in any suitable manner, such as with one or more hinges.

In addition, one or more channels and/or one or more wheels may be disposed on the housing 206 in any suitable location as previously described. In the embodiment shown in FIG. 3, two channels 260 are disposed on the bottom panel 212.

Figure 4:
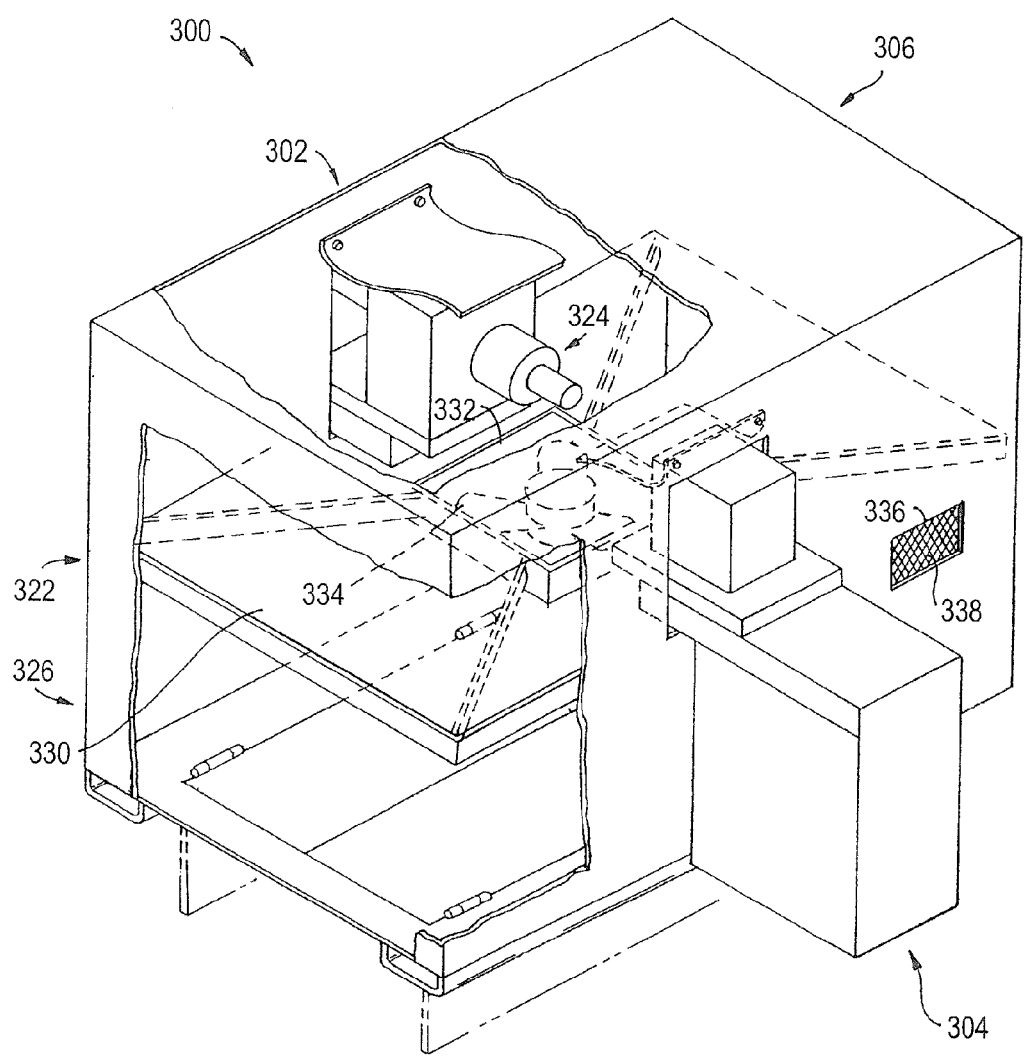
FIG. 4 shows a fourth embodiment of the machining system including the movable housing and a funnel.

Referring to FIG. 4, a fourth embodiment of the machining system 300 is shown. In this embodiment, machining system includes a workpiece presenter 302, a tool presenter 304, and a moveable housing 306 having an upper portion 322 that at least partially defines a machining envelope 324 and a lower portion 326 disposed proximate the upper portion 322 as previously described. In addition, the upper portion 322 includes a funnel 330 having an aperture 332 and optionally a blower 334 and one or more vent openings 336 that may include a filter 338 similar to the embodiment shown in FIG. 2.

Optionally, any of the embodiments of the present invention may incorporate internal or external blowers or air handling systems adapted to provide negative air pressure in the machining area.

The present invention may be used with any suitable machining system or process, such as dry machining or a minimum quantity lubrication (MQL) machining system in which low levels of lubricant are provided through the cutting tool to facilitate machining of the workpiece. Moreover, the present invention does not require separate conveyance equipment, such as mechanical conveyors, or forced air to remove chips and other particulates. As a result, maintenance and cleaning of such conveyance equipment is eliminated.

The present invention also eliminates the need for air filtration equipment, such as an oil mist collectors. As a result, air handling and air treatment equipment, such as blowers, ducts, valves, and filters is eliminated. Moreover, the elimination of air handling and treatment equipment helps reduce air circulation inside the housing. As a result, metal dust and oil mist may settle rapidly into the hopper. Alternatively, air may be circulated in the machining envelope to reduce dust and oil mist buildup on interior housing surfaces.

While the best mode for carrying out the invention has been described in detail, those familiar with the art to which this invention relates will recognize various alternative designs and embodiments for practicing the invention as defined by the following claims.

What is claimed is:

1. A machining system having a machining envelope, the machining system comprising: a housing defining at least a portion of the machining envelope, a bottom portion of the housing having an access port; a hopper having a top surface defining an opening, the hopper adapted to be inserted through the access port into the bottom portion of the housing; and a seal extending from the top surface to the housing such that the seal is spaced apart from and does not extend into the opening and such that the seal extends completely around the opening; wherein the hopper is configured to receive particulates when positioned below the machining envelope.

2. The machining system of claim 1 further comprising a lift platform adapted to raise the hopper to position the seal adjacent to the housing and the top surface.

3. The machining system of claim 1 wherein the hopper further comprises a bottom panel and a set of wheels disposed proximate the bottom panel.

4. The machining system of claim 1 wherein the hopper further comprises a bottom panel and at least one channel adapted to receive a forklift fork disposed proximate the bottom panel.

5. The machining system of claim 1 further comprising a funnel adapted to direct particulates into the hopper disposed on the housing above the hopper and below the machining envelope.

6. The machining system of claim 5 wherein the funnel includes a blower adapted to blow particulates into the hopper.

7. The machining system of claim 6 wherein the hopper further comprises a vent and a filter adapted to allow pressurized air to exit the hopper disposed proximate the vent.

8. The machining system of claim 6 wherein the housing further comprises a housing vent disposed below the funnel and a filter adapted to allow pressurized air to exit the hopper and prevent particulates from exiting the hopper disposed proximate the housing vent.

9. A machining system comprising:
a housing including:
an upper portion defining a machining envelope;
a lower portion disposed proximate the upper portion, the lower portion having an access port; and
a mating portion disposed proximate the upper and lower portions defining a first aperture, the mating portion having a bottom surface; and
a chip hopper adapted to be inserted through the access port into the lower portion, the chip hopper including:

a top surface defining a second aperture; and a seal disposed on the top surface such that the seal extends completely around and is spaced apart from the second aperture;

wherein the seal engages the bottom surface of the mating portion to inhibit particulate s from exiting the housing.

10. The machining system of claim 9 wherein the lower portion further comprises a second access port adapted to permit removal of the chip hopper disposed opposite the first access port.

11. The machining system of claim 9 wherein the lower portion further comprises a lift mechanism adapted to raise the chip hopper to engage the seal with the bottom surface.

12. The machining system of claim 9 wherein the chip hopper further comprises a bottom panel having a set of wheels and at least one channel adapted to receive a forklift fork.

* * * * *